(12) United States Patent
Ohashi (10) Patent No.: US 8,640,751 B2
(45) Date of Patent: Feb. 4, 2014

(54) PNEUMATIC TIRE WITH TREAD HAVING SIPES

(75) Inventor: Toshiyuki Ohashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1183 days.

(21) Appl. No.: 12/140,384

(22) Filed: Jun. 17, 2008

(65) Prior Publication Data

US 2009/0078350 A1 Mar. 26, 2009

(30) Foreign Application Priority Data

Sep. 26, 2007 (JP) ................................ 2007-249609

(51) Int. Cl.
*B60C 11/12* (2006.01)

(52) U.S. Cl.
USPC ............ 152/209.18; 152/209.21; 152/209.23; 152/DIG. 3

(58) Field of Classification Search
USPC .............. 152/209.18, 209.21, 209.23, DIG. 3
See application file for complete search history.

(56) References Cited

U.S. PATENT DOCUMENTS

| | | | | |
|---|---|---|---|---|
| 6,681,824 B2 * | 1/2004 | Lopez | ...................... | 152/DIG. 3 |
| 7,017,634 B2 * | 3/2006 | Radulescu et al. | ........ | 152/DIG. 3 |
| 7,143,799 B2 * | 12/2006 | Collette et al. | ............ | 152/DIG. 3 |
| 2003/0101851 A1 * | 6/2003 | Domange et al. | ............ | 76/101.1 |
| 2003/0201048 A1 | 10/2003 | Radulescu et al. | | |
| 2006/0088618 A1 | 4/2006 | Radulescu et al. | | |

FOREIGN PATENT DOCUMENTS

| | | |
|---|---|---|
| CN | 1853965 | 11/2006 |
| DE | 60108972 D1 | 12/2005 |
| EP | 1 275 527 | 2/2005 |
| JP | 04353432 B2 | 12/1992 |
| JP | 09-272312 | 10/1997 |
| JP | 10-052824 | 2/1998 |
| JP | 2000-102925 * | 4/2000 |
| JP | 2000-177330 | 6/2000 |
| JP | 2002-316517 | 10/2002 |
| JP | 2002-356105 | 12/2002 |
| JP | 2005-247105 | 9/2005 |
| JP | 2006-069440 | 3/2006 |
| JP | 2007-008303 | 1/2007 |

OTHER PUBLICATIONS

Machine translation for Japan 2000-102925 (no date).*
Chinese First Office Action for application No. 200810168314.7, dated Nov. 13, 2009, (with English translations) 7 pages.
German Office Action for Application No. 10 2008 039 069.0-16, 6 pages.
Japanese Office Action for Patent Application No. 2007-249609 dated Dec. 8, 2011 with English translation.
Chinese Office Action for Application No. 200810168314.7 dated Jul. 6, 2011 with English translation.

* cited by examiner

*Primary Examiner* — Steven D Maki
(74) *Attorney, Agent, or Firm* — Fish & Richardson P.C.

(57) ABSTRACT

A pneumatic tire structured such that a sipe is formed in a land portion of a tread surface. The sipe has a wide portion extending along a longitudinal direction at least at one position in a depth direction. The wide portion is structured by alternately arranging concave portions which are smaller in the longitudinal direction and the depth direction than the sipe, in both sides of a sipe wall surface along the longitudinal direction of the sipe.

3 Claims, 8 Drawing Sheets

PNEUMATIC TIRE WITH TREAD HAVING SIPES

FIELD OF THE INVENTION

The present invention relates to a pneumatic tire in which a sipe is formed in a land portion of a tread surface, and is particularly useful as a studless tire.

DESCRIPTION OF THE RELATED ART

Conventionally, in the studless tire, a cut called as the sipe is formed in the land portion of a block, a rib or the like, and a traveling performance (hereinafter, called as an ice performance) on an ice road surface having a low friction coefficient is increased by an edge effect and a drainage effect generated by the sipe. As the sipe mentioned above, there have been put to a practical use a linear sipe extending linearly along a longitudinal direction, a waveform sipe extending like a waveform and the like.

Since a rubber is incompressible, a motion of the tread surface being in contact with the road surface becomes great in the case that a load is applied to the tire, so that an opening portion of the sipe tends to be closed. Particularly, since the tread surface tends to be moved due to its slip, the sipe is easily closed and the opening portion is narrowed, on the ice road surface having the low friction coefficient, there is a case that the edge effect and the drainage effect to be essentially achieved by the sipe are lowered.

Figure 8:
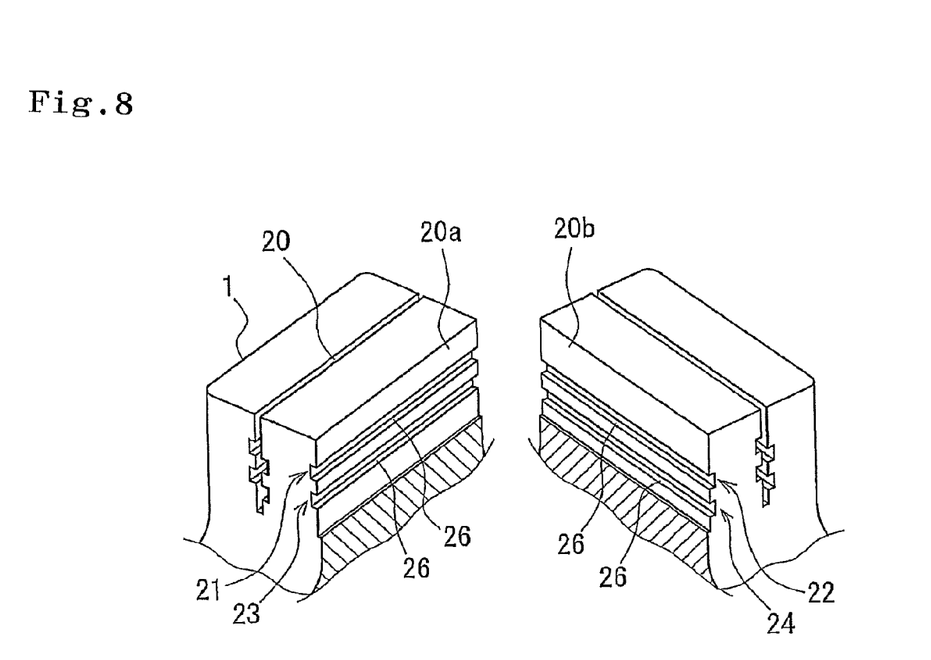
FIG. 8 shows a perspective view of a vertical cross section at a time of dividing a conventional sipe along the longitudinal direction.
Figure 9:
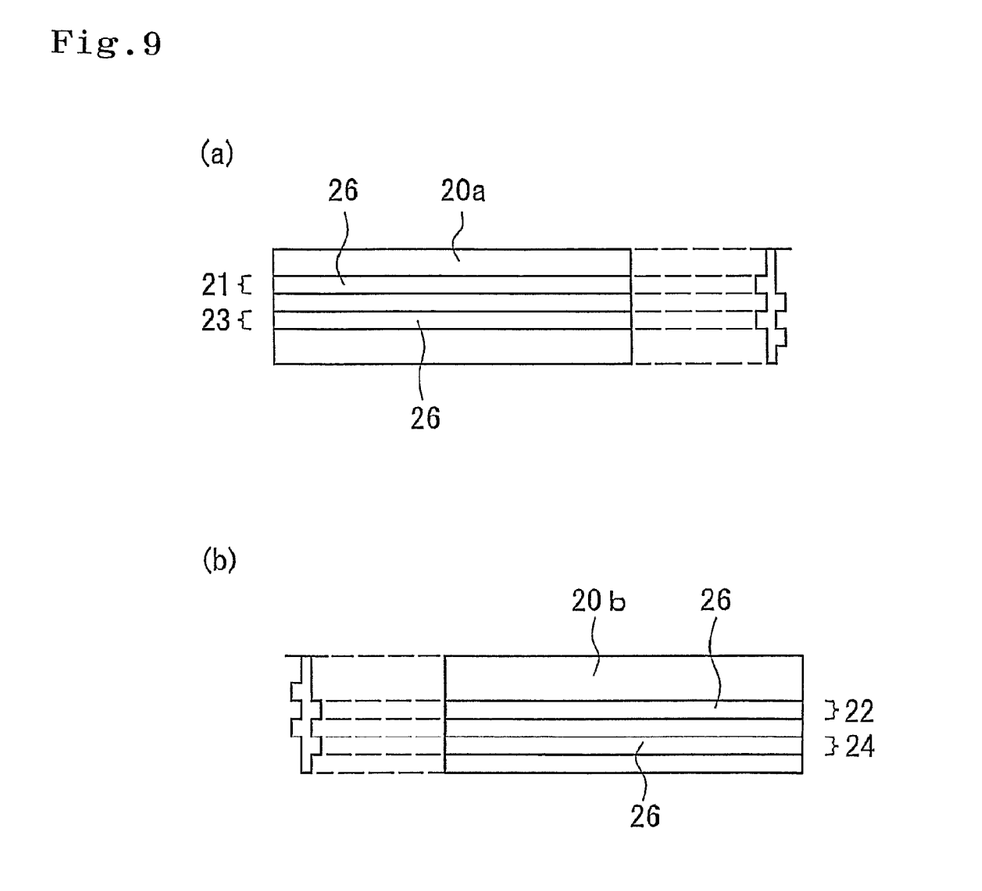
FIGS. 9(a) and 9(b) are front elevational views showing a sipe wall surface of the conventional sipe.

As a structure for solving the problem, Japanese Unexamined Patent Publication No. 2007-8303 describes a tire in which a sipe 20 having wide portions 21 to 24 as shown in FIGS. 8 and 9 is formed in a block 1 (one example of a land portion). The wide portions 21 to 24 are structured by arranging a concave portion 26 extending in a longitudinal direction of the sipe 20 in sipe wall surfaces 20a and 20b. In the case that a tread rubber is exposed to the load, it is possible to absorb a deformation generated by the load by the wide portions 21 to 24. As a result, it is possible to suppress a narrowness of the opening portion of the sipe, and it is possible to secure the edge effect and the drainage effect obtained by the sipe.

However, in the sipe structure mentioned above, since a portion having a large sipe width linearly extends long, a rigidity of the land portion tends to be lowered. Particularly, if a wear makes progress and the wide portion appears on the tread surface, it is known that the rigidity of the land portion is extremely lowered. Since the deterioration of the rigidity of the land portion mentioned above causes a reduction of a ground contact area due to an excessive collapse of the land portion, and deteriorates the edge effect and the drainage effect, it has been known that the performance can be improved by improving the rigidity of the land portion.

Japanese Unexamined Patent Publication No. 2005-247105 describes a sipe having a first wide portion extending in a depth direction from a tread surface and terminating without reaching a sipe bottom portion, and a second wide portion a position of which is differentiated in a longitudinal direction and the depth direction from the first wide portion. However, the sipe structure prevents the opening portion from being completely closed at a time of braking or the like, and does not have a wide portion along the longitudinal direction. Accordingly, it is impossible to expect an effect of inhibiting the opening portion from being narrowed, by absorbing the deformation by the wide portion.

Further, Japanese Unexamined Patent Publication No. 9-272312 describes a sipe provided with a wide portion reaching a sipe bottom portion from a tread surface at three or more positions in a longitudinal direction. However, the sipe structure inhibits a crack from being generated in the sipe bottom portion in a pneumatic tire for a heavy load, and does not have a wide portion along the longitudinal direction. Accordingly, it is impossible to expect the effect of inhibiting the opening portion from being narrowed, by absorbing the deformation by the wide portion.

In short, with respect to the problem mentioned above, it is important to secure the rigidity of the land portion so as to prevent the excessive collapse while making the tread rubber be easily deflected in the depth direction and absorbing the deformation by the wide portion so as to inhibit the opening portion from being narrowed, however, the sipe structures described in Japanese Unexamined Patent Publication Nos. 2007-8303, 2005-247105 and 9-272312 do not disclose a solving means.

SUMMARY OF THE INVENTION

The present invention is made by taking the actual condition mentioned above into consideration, and an object of the present invention is to provide a pneumatic tire which can secure an edge effect and a drainage effect generated by a sipe, by securing a rigidity of a land portion so as to prevent an excessive collapse while inhibiting an opening portion of the sipe from being narrowed.

The object can be achieved by the following present invention. That is, the present invention provides a pneumatic tire structured such that a sipe is formed in a land portion of a tread surface, wherein the sipe has a wide portion extending along a longitudinal direction at least at one position in a depth direction, and wherein the wide portion is structured by alternately arranging concave portions which are smaller in the longitudinal direction and the depth direction than the sipe, in both sides of a sipe wall surface along the longitudinal direction of the sipe.

In the pneumatic tire in accordance with the present invention, since the wide portion is constituted by a plurality of concave portions as mentioned above, the portion having the large sipe width is intermittently formed short in the longitudinal direction, in each of the sipe wall surfaces. Accordingly, it is possible to inhibit the rigidity of the land portion from being lowered by the wide portion. Even if a wear makes progress and the wide portion appears on the tread surface, the rigidity of the land portion is not extremely lowered. Further, since the concave portion mentioned above is arranged alternately in both sides of the sipe wall surface, whereby the wide portion along the longitudinal direction is constructed, it is possible to make the tread rubber be easily deflected in the depth direction, and it is possible to absorb the deformation by the wide portion so as to inhibit the opening portion from being narrowed. As a result, it is possible to secure the edge effect and the drainage effect generated by the sipe so as to improve the ice performance.

In the structure mentioned above, it is preferable that the sipe has the wide portion at a plurality of positions in the depth direction, and the concave portions which are adjacent to each other in the depth direction are concaved in inversed directions to each other. Since the sipe has the wide portion at a plurality of positions in the depth direction, it is possible to improve the effect of absorbing the deformation by the wide portion so as to inhibit the opening portion from being narrowed. Further, since the concave portions which are adjacent in the depth direction are concaved in an inverse direction, a rigidity balance of the land portion becomes good, and it is possible to effectively suppress the excessive collapse of the land portion.

DETAILED DESCRIPTION OF THE PREFERRED EMBODIMENTS

Figure 1:
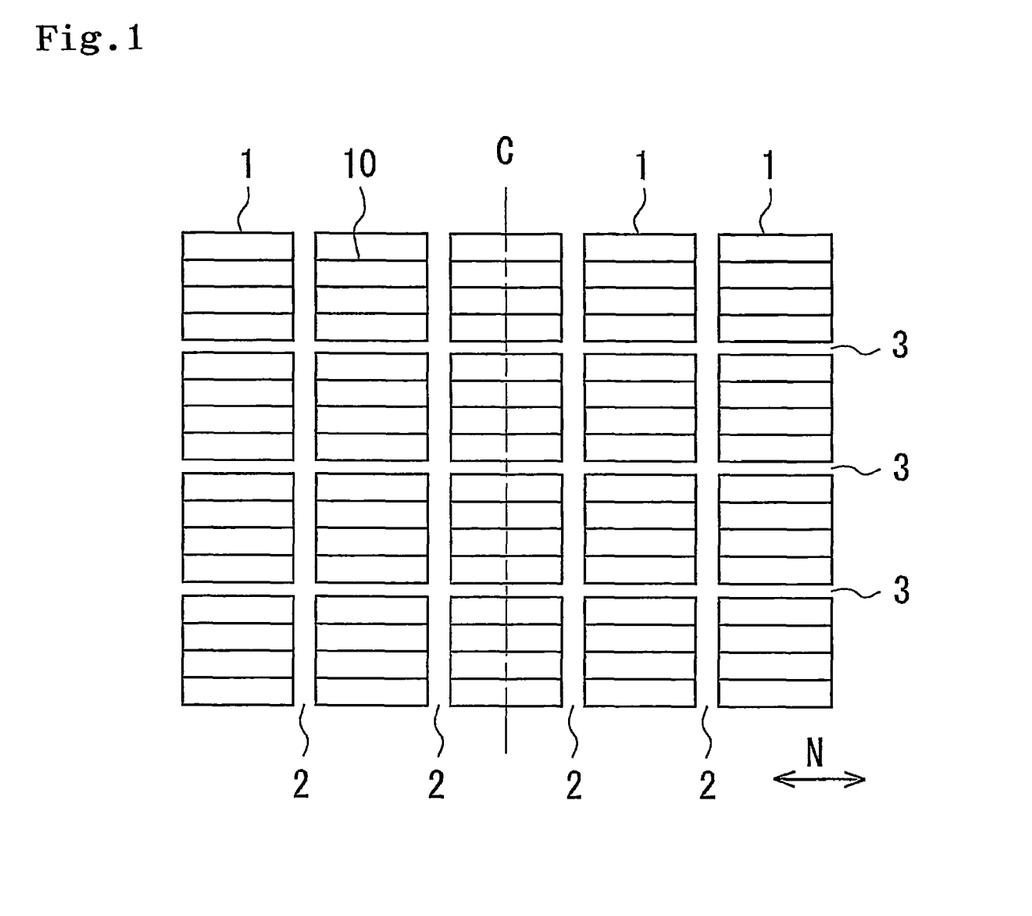
FIG. 1 shows an expansion plan view showing an embodiment of a tread surface of a pneumatic tire in accordance with the present invention.

An embodiment of the present invention will be explained with reference to the drawings. FIG. 1 is an expansion plan view showing an embodiment of a tread surface of a pneumatic tire in accordance with the present invention. The pneumatic tire is provided with a tread pattern having a plurality of blocks 1 (one example of a land portion). The block 1 is comparted by a main groove 2 extending in a tire circumferential direction and a transverse groove 3 extending in a tire width direction, and five rows of blocks 1 are arranged symmetrically with respect to a tire equator line C.

Figure 2:
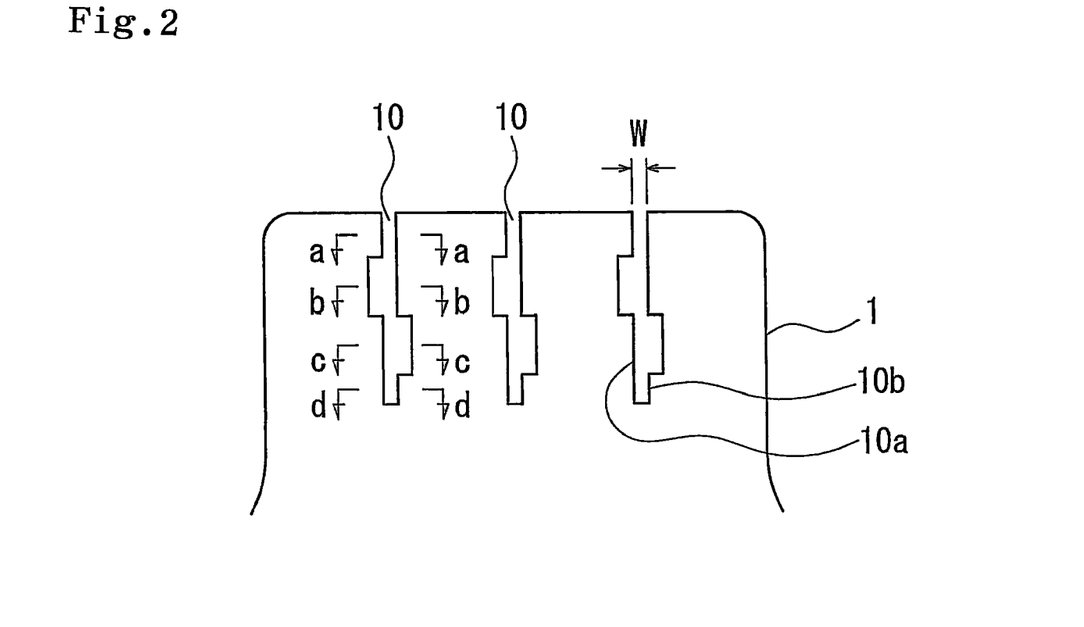
FIG. 2 shows a side elevational view of a block provided in the tread surface.

FIG. 2 is a side elevational view of the block 1, a vertical direction comes to a depth direction of a sipe 10, and a direction perpendicular to a paper surface comes to a longitudinal direction N of the sipe 10. In the present embodiment, there is shown an example in which the longitudinal direction N of the sipe 10 is in parallel to a tire width direction, however, the present invention is not limited to this. Each of the blocks 1 is provided with a plurality of (three in the present embodiment) sipes 10 each having a linear opening portion, in parallel at a predetermined interval. Reference symbol W denotes a sipe width in the tread surface.

The sipe 10 in accordance with the present embodiment is constituted by a both-side open sipe in which both ends are open in a side wall of the block 1, however, the present invention is not limited to this, but one end or both ends may be terminated in an inner portion of the block 1. In this case, if one end or both ends of the sipe 10 is open in the side wall of the block 1, a rigidity of the block 1 tends to be low. Accordingly, the present invention is particularly useful in the case that one end or both ends of the sipe is open.

Figure 3:
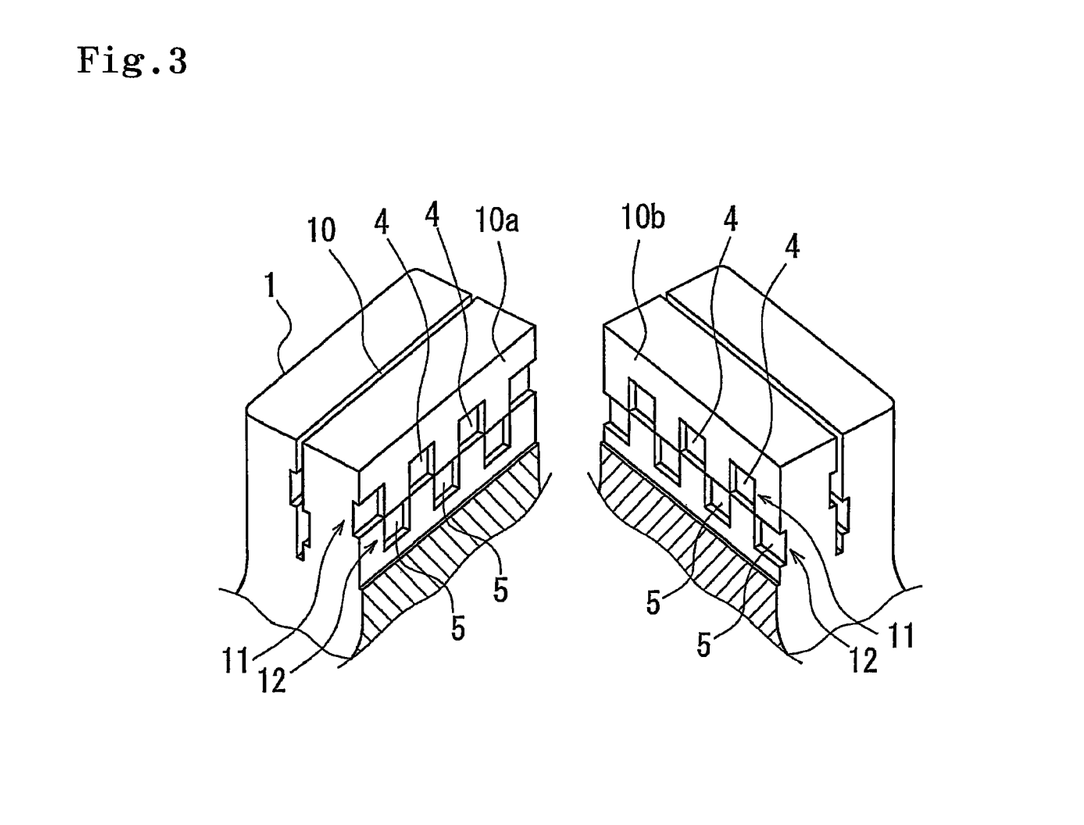
FIG. 3 shows a perspective view of a vertical cross section at a time of dividing the sipe along the longitudinal direction.

FIG. 3 is a perspective view of a vertical cross section at a time of dividing the sipe 10 along the longitudinal direction N. FIGS. 4(a) to 4(d) are horizontal cross sectional views of the sipe 10, and respectively, FIG. 4(a) shows a cross section along a line a-a in FIG. 2, FIG. 4(b) shows a cross section along a line b-b, FIG. 4(c) shows a cross section along a line c-c and FIG. 4(d) shows a cross section along a line d-d. FIGS. 5(a) and 5(b) are front elevational views showing a sipe wall surface of the sipe 10, in which FIG. 5(a) shows a sipe wall surface 10a corresponding to a left side in FIG. 3, and FIG. 5(b) shows a sipe wall surface 10b corresponding to a right side in FIG. 3.

Figure 4:
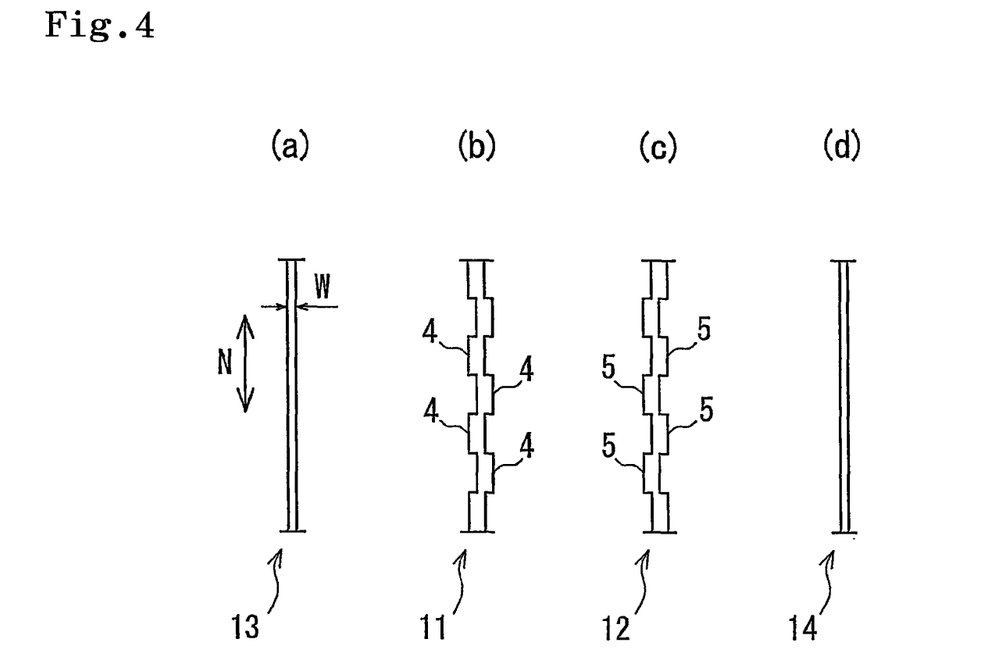
FIGS. 4(a) to 4(d) are horizontal cross sectional views of the sipe.
Figure 5:
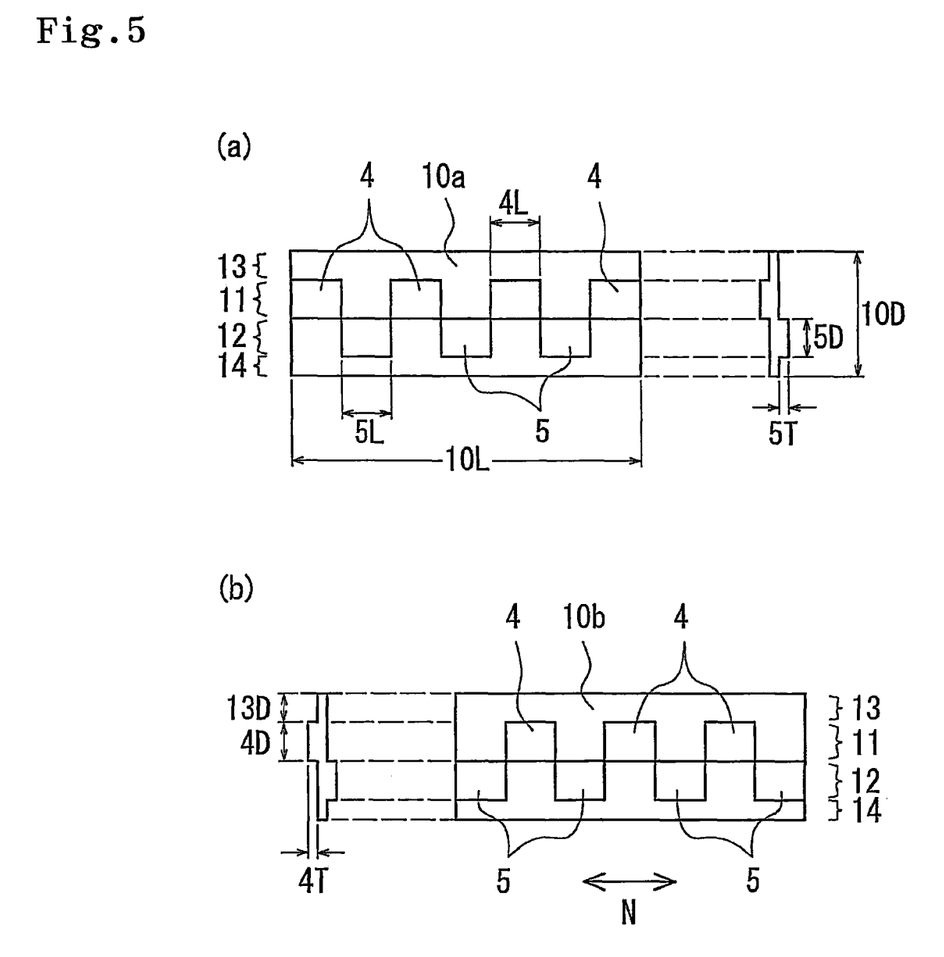
FIGS. 5(a) and 5(b) are front elevational views showing a sipe wall surface of the sipe.

In the present embodiment, as shown in FIGS. 3 to 5, there is shown an example in which the sipe 10 has wide portions 11 and 12 along the longitudinal direction N at two positions in the depth direction. The wide portion 11 is structured by alternately arranging a concave portion 4 which is smaller in the longitudinal direction and the depth direction than the sipe 10, in both sides of the sipe wall surfaces 10a and 10b along the longitudinal direction N. Relations between a length 4L and a depth 4D of the concave portion 4 and a sipe length 10L are respectively expressed by 4L<10L and 4D<10D.

In each of the sipe wall surfaces 10a and 10b, a plurality of concave portions 4 are arranged so as to be spaced in the longitudinal direction N, and a portion having a large sipe width is intermittently formed short in the longitudinal direction N. Accordingly, it is possible to inhibit a rigidity of the block 1 from being lowered by the wide portion 11. Further, even in the case that a wear makes progress and the wide portion 11 appears on a tread surface, the rigidity of the block 1 is not extremely lowered. Further, as shown in FIG. 4(b), since the portion having the large sipe width is formed over a whole length of the sipe 10, it is possible to make a tread rubber be easily deflected in the depth direction, and it is possible to absorb a deformation by the wide portion 11 so as to inhibit an opening portion from being narrowed. As a result, it is possible to secure an edge effect and a drainage effect generated by the sipe 10, and it is possible to improve an ice performance.

In the present embodiment, a continuity of the concave portion 4 is secured along the longitudinal direction N as shown in FIG. 4(b), and the portion having the large sipe width is continuously formed in a whole of the wide portion 11. Accordingly, it is possible to effectively absorb a deformation at a time of applying a load by the wide portion 1, and an effect of inhibiting the opening portion of the sipe 10 from being narrowed is improved. In the present invention, the concave portions 4 arranged in the opposing sipe wall surfaces may overlap in the longitudinal direction N, however, in the light of inhibiting the rigidity of the block 1 from being lowered, it is preferable to bring positions of side ends of the concave portions 4 into line with each other such as the present embodiment.

The wide portion 12 has approximately the same structure as the wide portion 11, and is structured by alternately arranging the concave portions 5 in both sides of the sipe wall surfaces 10a and 10b along the longitudinal direction N. In the present invention, it is sufficient that the sipe has at least one wide portion, however, in the case that the sipe has a plurality of wide portions 11 and 12 such as the present embodiment, it is possible to make the tread rubber be easily deflected in the depth direction, and it is possible to improve the effect of absorbing the deformation by the wide portion so as to inhibit the opening portion from being narrowed. In this case, the wide portion may be provided at three or more positions in the depth direction.

The concave portion 4 and the concave portion 5 which are adjacent in the depth direction are concaved in inversed directions to each other. In other words, the concave portion 4 provided in the sipe wall surface 10a is adjacent to the concave portion 5 provided in the sipe wall surface 10b in the depth direction, and the concave portion 4 provided in the sipe wall surface 10b is adjacent to the concave portion 5 provided in the sipe wall surface 10a in the depth direction. Accordingly, a rigidity balance of the block 1 is improved, and it is possible to effectively suppress an excessive collapse of the block 1. In addition, it is possible to suppress a displacement of a center of layout of the sipe 10, and it is possible to uniformize a ground contact pressure within the block 1 so as to contribute to an improvement of the ice performance.

As shown in FIGS. 3 and 5, in the present embodiment, the concave portion 4 and the concave portion 5 do not overlap in the longitudinal direction N, in each of the sipe wall surfaces 10a and 10b, are brought into line with each other in their positions of side ends. Accordingly, since the concave portion 4 and the concave portion 5 are not continuous in the depth direction, in any one of the sipe wall surfaces 10a and 10b, it is possible to preferably inhibit the rigidity of the block 1 from being lowered.

The shapes of the concave portions 4 and 5 are not particularly limited, but are preferably formed as a space portion having a rectangular plate shape such as the present embodiment. Accordingly, in the case that the tread rubber is exposed to a load, it is possible to suitably absorb the deformation caused by the load by the wide portions 11 and 12. In the present embodiment, there is shown an example in which the dimensions and the shapes of the concave portion 4 and the concave portion 5 are uniformly identical, however, they may be differentiated from each other.

It is preferable that ratios 4L/10L and 5L/10L of length between the concave portions 4 and 5 and the sipe 10 are respectively between 0.05 to 0.3, and it is more preferable that they are between 0.05 to 0.2. If these ratios are less than 0.05, there is a tendency that the effect of making the tread rubber be easily deflected in the depth direction and absorbing the deformation by the wide portion so as to inhibit the opening portion from being narrowed becomes small. Further, if the ratios exceed 0.3, there is a tendency that the effect of inhibiting the rigidity of the block 1 from being lowered becomes small.

It is preferable that depths 4D and 5D of the concave portions 4 and 5 are between 0.3 to 2.5 mm, and it is more preferable that they are between 1 to 1.5 mm. If they are less than 0.3 mm, there is a tendency that the effect of making the tread rubber be easily deflected in the depth direction and absorbing the deformation by the wide portion so as to inhibit the opening portion from being narrowed becomes small. Further, if they exceed 2.5 mm, there is a tendency that it is hard to arrange a plurality of wide portions in the sipe, and the effect of inhibiting the rigidity of the block 1 from being lowered becomes small. The sipe depth 10D is preferably set to 30 to 80% of the depth of the main groove 2 in the light of expressing a sufficient edge effect generated by the sipe 10.

It is preferable that thicknesses 4T and 5T of the concave portions 4 and 5 are between 50 to 150% with respect to the sipe width W. If they are less than 50%, there is a tendency that the effect of absorbing the deformation by the wide portions 11 and 12 becomes small. Further, if they exceed 150%, there is a case that the rigidity of the block 1 is lowered and the collapse is excessively enlarged. Further, it is preferable that the sipe width W is between 0.2 to 0.6 mm in the light of expressing a sufficient edge effect generated by the sipe 10.

The sipe 10 is provided with a non-wide portion 13, the wide portion 11, the wide portion 12 and a non-wide portion 14 from the tread surface toward the sipe bottom portion. The non-wide portion 13 extends in the depth direction while maintaining the sipe width W, and is formed as a flat surface in the present embodiment. As mentioned above, since the non-wide portion 13 is arranged close to the tread surface, it is possible to prevent the wide portion 11 from being exposed to the tread surface, in an early stage of a wear in which the block 1 tends to be collapsed. It is preferable that a depth 13D of the non-wide portion 13 is between 0.5 to 1.5 mm.

Figure 6:
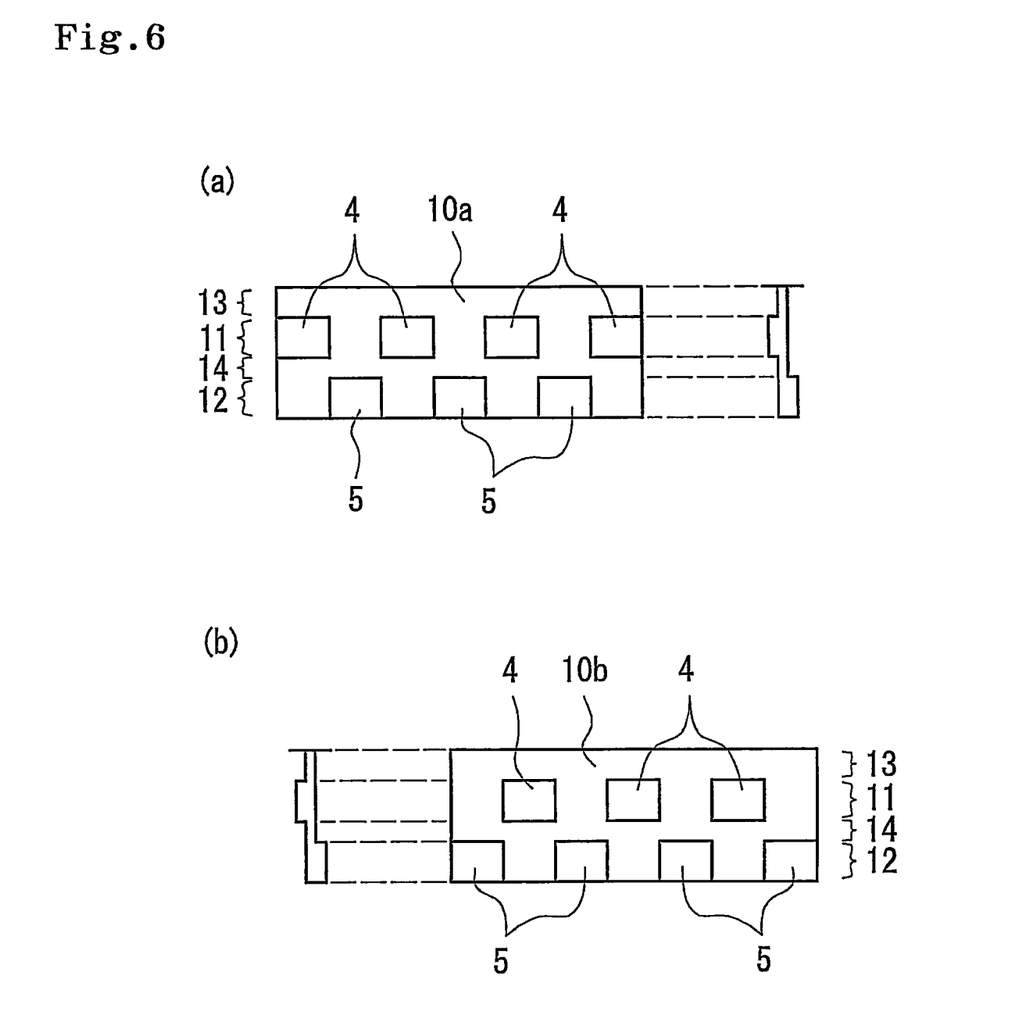
FIGS. 6(a) and 6(b) are front elevational views showing another embodiment of the sipe wall surface.

The non-wide portion 14 extends in the depth direction while maintaining the sipe width W in the same manner as the non-wide portion 13, and is formed as a flat surface in the present embodiment. Accordingly, since the concave portions 4 and 5 are not arranged in the sipe bottom portion, a portion to which a stress is concentrated is not formed, and it is possible to inhibit a crack from being generated in the sipe bottom portion. In the present invention, as shown in FIG. 6, the non-wide portion 14 may be interposed between the wide portion 11 and the wide portion 12. Even in this case, it is preferable that the concave portion 4 and the concave portion 5 which are adjacent in the depth direction are concaved in the inversed directions to each other.

In the present invention, it is preferable that a sipe density corresponding to a sipe length per unit area of the block 1 is 0.05 mm/mm$^2$ or more. If the sipe density is less than 0.05 mm/mm$^2$, there is a case that the effect to be essentially achieved by the sipe 10 is not suitably achieved. Further, it is preferable that the sipe density does not exceed 0.2 mm/mm$^2$ in the light of suitably securing the rigidity of the block 1.

Figure 7:
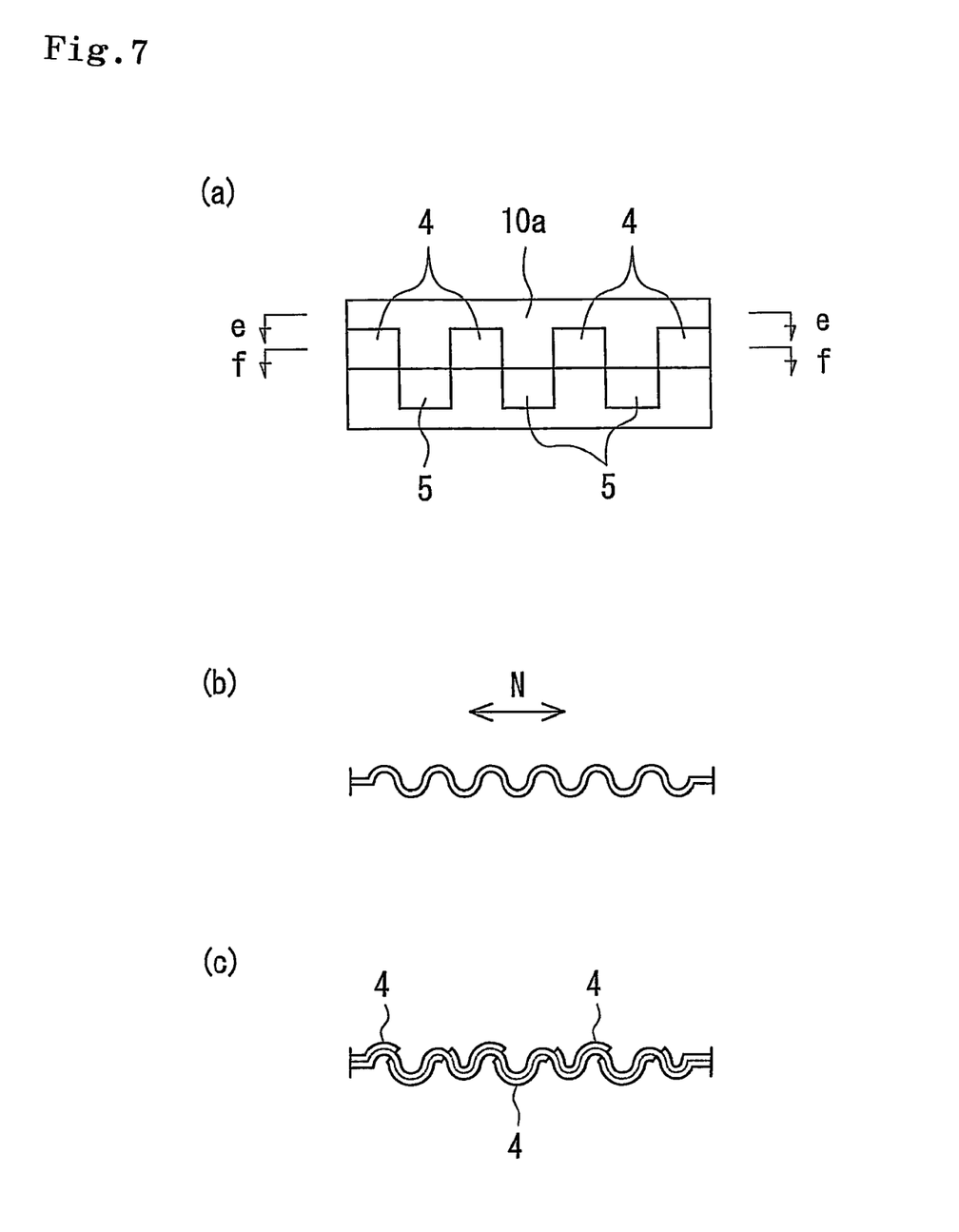
FIGS. 7(a), 7(b) and 7(c) are views showing the sipe wall surface and transverse sections in a waveform sipe.

In FIGS. 1 to 6, there is shown the example in which the sipe 10 is constituted by the linear sipe, however, the present invention is not limited to this, but may employ a waveform sipe as shown in FIG. 7. FIG. 7(a) is a front elevational view of a sipe wall surface, FIG. 7(b) is a cross sectional view along a line e-e, and FIG. 7(c) is a cross sectional view along a line f-f. In the waveform sipe, since the opening portion of the sipe is hard to be narrowed in comparison with the linear sipe, it is possible to effectively secure the edge effect and the drainage effect generated by the sipe in cooperation with the effect of inhibiting the opening portion from being narrowed by the wide portion mentioned above, and it is possible to inhibit the block 1 from being collapsed on a dry road surface.

In the case of the waveform sipe, it is preferable that ratios of the lengths of the concave portions 4 and 5 with respect to a wavelength of the waveform are between about 0.8 to 1.2. Accordingly, it is possible to adjust the length of the concave portion in the waveform sipe so as to improve the effect of absorbing the deformation by the wide portion so as to inhibit the opening portion from being narrowed, and a blade for forming the waveform sipe can be easily manufactured.

The pneumatic tire in accordance with the present invention is the same as the normal pneumatic tire except that the sipe as mentioned above is provided in the land portion, and the present invention can employ any of the conventionally known material, shape, structure, manufacturing method and the like.

The present invention can be applied to a so-called summer tire, however, since the present invention is excellent in the ice performance, the present invention is particularly useful as a studless tire (a winter tire).

Other Embodiments (1) The tread pattern provided in the pneumatic tire in accordance with the present invention is not particularly limited. Accordingly, it is possible to apply to a block having any shapes, for example, a V shape, a polygonal shape, a curve keynote or the like, in place of the block having the rectangular shape in the plan view. Further, it is possible to employ a rib extending in a linear shape or a zigzag shape along a tire circumferential direction in place of the block or in addition thereto. Further, in the present invention, the sipe structure as mentioned above can be employed with respect to all the land portions within the tread pattern, however, may be employed only with respect to a partial land portion within the tread pattern.

(2) In the embodiment mentioned above, there is shown the example in which the dimensions of the concave portions 4 and 5 are uniformly identical, however, the dimensions may be differentiated from each other in the present invention. As a preferable embodiment in this case, there can be listed up a structure in which the thickness of the concave portions positioned in both end portions of the sipe is made smaller than the thickness of the concave portion positioned in the center of the sipe. There is a tendency that both end portions of the sipe is easily moved at a time of traveling on the dry road surface, however, in accordance with the structure mentioned above, it is possible to inhibit the motion of both the end portions of the sipe so as to contribute to preventing an irregular wear.

Further, as the other preferable embodiment, there can be listed up a structure in which the wide portion is provided at a plurality of positions in the depth direction of the sipe, and the thickness of the concave portion positioned close to the sipe bottom portion is made larger than the thickness of the concave portion close to the tread surface. In accordance with the structure mentioned above, since the wide portion having the large thickness is exposed to the tread surface in a state that the wear makes progress and the height of the land portion is reduced, it is possible to secure the collapse of the land portion in a middle or end stage of the wear, and it is possible to suitably achieve the edge effect generated by the sipe.

EXAMPLE

An example tire which concretely shows the structure and effect of the present invention will be explained.
(1) Ice Braking Performance
A tire is installed to an actual car (FR sedan of 3000 cc class), and a braking distance at a time of traveling on an ice road surface, applying a braking force from a speed 40 km/h and actuating an ABS is measured. An evaluation is shown by an index number in the case of setting a comparative example to 100, and indicates that the larger the numerical value is, the better the ice braking performance is.
(2) Ice Turning Performance
The ice turning performance is evaluated by installing the tire to the actual car, traveling on the ice road surface in accordance with a lemniscate curve (a figure-8 curve: R=25 m circle) and measuring a lap time. An evaluation is shown by an index number in the case of setting a comparative example to 100, and indicates that the larger the numerical value is, the better the ice turning performance is.

COMPARATIVE EXAMPLE

A comparative example is set to a tire having a tread pattern as shown in FIG. 1 and forming a sipe having a wide portion shown in FIGS. 8 and 9 in a block. A tire size is set to 205/65R15, a sipe depth D is set to 6.5 mm, a depth of each of the wide portions is set to 1 mm, a depth of a non-wide portion close to the tread surface is set to 1.5 mm, a sipe width W is set to 0.3 mm, and a thickness of each of concave portions is set to 0.3 mm.

EXAMPLE

An example is set to a tire having a tread pattern as shown in FIG. 1 and forming a sipe having a wide portion shown in FIGS. 2 to 5 in a block. A tire size is set to 205/65R15, a sipe depth D is set to 6.5 mm, a depth of each of the wide portions is set to 2 mm, a depth of a non-wide portion close to the tread surface is set to 1.5 mm, a sipe width W is set to 0.3 mm, and a thickness of each of concave portions is set to 0.3 mm. Results of the evaluation are shown in Table 1.

TABLE 1

|  | Comparative Example | Example |
| --- | --- | --- |
| Ice braking performance | 100 | 107 |
| Ice turning performance | 100 | 107 |

In spite that a total volume of the wide portion is identical between the comparative example and the example, the ice braking performance and the ice turning performance are improved in the example in comparison with the comparative example, as shown in Table 1. It is thought that the example can inhibit the rigidity of the land portion from being lowered in comparison with the comparative example, and the edge effect and the drainage effect generated by the sipe are increased, in addition that the example can make the tread rubber be easily deflected in the depth direction and absorb the deformation by the wide portion so as to inhibit the opening portion from being narrowed.

What is claimed is:
1. A pneumatic tire structured such that a sipe is formed in a land portion of a tread surface,
   wherein the sipe has a wide portion extending along a longitudinal direction of the sipe at least at one position in a depth direction of the sipe, the wide portion being formed by at least three alternating concave and inversed concave portions on one wall of the sipe opposing an equal number of alternating inversed concave and concave portions, respectively, on the other wall of the sipe, the concave portions being formed in the sipe wall surfaces, which extend in a depth direction of the sipe,
   wherein in the wide portion each of the concave portions in both sipe wall surfaces along the longitudinal direction of the sipe has a smaller length than the length of the sipe in the longitudinal direction and each of the concave portions in both sipe wall surfaces also has a shorter depth than the depth of the sipe,
   wherein the sipe has a wide portion at least at a second position in the depth direction of the sipe, the wide portion at at least the second position being formed by at least three alternating concave and inversed concave portions on one wall of the sipe opposing an equal number of alternating inversed concave and concave portions, respectively, on the other wall of the sipe, and adjacent portions in the depth direction on each wall of the sipe are concaved in inversed directions to each other,
   further wherein the sipe has a non-wide portion, bordering the tread surface, extending along the longitudinal direction of the sipe and having a uniform width which is narrower than that of the wide portion of the sipe,
   further wherein the sipe has a non-wide portion, bordering the sipe bottom, extending along the longitudinal direction of the sipe and having a uniform width which is narrower than that of the wide portion of the sipe, and
   further wherein the inversed concave portions are constructed with surfaces that do not project into the sipe farther than the sipe wall surface having the inversed concave portions, such that the inversed concave portions do not project into concave portions on the other sipe wall surface.

2. The pneumatic tire according to claim 1, wherein the sipe has at least three concave portions along the longitudinal direction of the sipe at each of the positions in the sipe depth direction, and concave portions in both longitudinal end portions of the sipe have a thickness that is smaller than the thickness of a concave portion positioned at the longitudinal center of the sipe.

3. The pneumatic tire according to claim 1, wherein the thickness of concave portions located nearer to the sipe bottom is larger than the thickness of concave portions located closer to the tread surface.

* * * * *